(12) United States Patent
Kirby et al.

(10) Patent No.: US 10,460,122 B1
(45) Date of Patent: Oct. 29, 2019

(54) DYNAMIC PERMISSION MODES

(71) Applicant: Qumulo, Inc., Seattle, WA (US)

(72) Inventors: Michael Patrick Kirby, Lynnwood, WA (US); Iain Michael Christopher Peet, Seattle, WA (US); Garrett Mathew Nickel, Bellevue, WA (US); Neal Thomas Fachan, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 16/234,395

(22) Filed: Dec. 27, 2018

(51) Int. Cl.
  G06F 21/62    (2013.01)
  H04L 29/06    (2006.01)
(52) U.S. Cl.
  CPC ........ G06F 21/6218 (2013.01); H04L 63/101 (2013.01); H04L 63/102 (2013.01)
(58) Field of Classification Search
  CPC .. G06F 21/6218; H04L 63/101; H04L 63/102
  See application file for complete search history.

(56) References Cited

U.S. PATENT DOCUMENTS

| | | | |
|---|---|---|---|
| 2004/0255048 A1 | 12/2004 | Lev Ran et al. | |
| 2005/0015674 A1* | 1/2005 | Haugh | G06F 21/6236 714/38.1 |
| 2006/0123005 A1* | 6/2006 | Burnett | G06F 21/6218 |
| 2009/0077087 A1* | 3/2009 | Urano | G06F 21/6218 |
| 2010/0241668 A1 | 9/2010 | Susanto et al. | |
| 2011/0039622 A1* | 2/2011 | Levenson | A63F 13/79 463/42 |
| 2011/0125799 A1* | 5/2011 | Kandasamy | G06F 21/6218 707/785 |
| 2015/0135331 A1* | 5/2015 | Das | G06F 21/6218 726/27 |
| 2016/0359859 A1 | 12/2016 | Capone | |
| 2018/0288057 A1* | 10/2018 | Varadamma | H04L 63/101 |

OTHER PUBLICATIONS

Kappes, G., Hatzieleftheriou, A., & Anastasiadis, S. V. (2013). Dike: Virtualization-aware Access Control for Multitenant Filesystems. University of Ioannina, Greece, Technical Report No. DCS2013-1, 8, 61-64. (Year: 2013).*
Hitz, D., Allison, B., Borr, A., Hawley, R., & Muhlestein, M. (Aug. 1998). Merging NT and UNIX filesystem permissions. In Proceedings of the 2nd conference on USENIX Windows NT Symposium—vol. 2 (pp. 10-10). USENIX Association. (Year: 1998).*
Office Communication for U.S. Appl. No. 16/004,208 dated Aug. 27, 2018, pp. 1-11.

* cited by examiner

Primary Examiner — Robert B Leung
(74) Attorney, Agent, or Firm — John W. Branch; Lowe Graham Jones PLLC

(57) ABSTRACT

Embodiments are directed to managing data in a file system. A file system engine provides a file system that includes file system objects that may be accessible by two or more clients that use different native permission schemes. And, a permissions engine may determine map rules based on characteristics of a request to access request a file. The permission engine may execute the one or more map rules to provide platform permission values based on the native permission values. The permission engine may compare requested platform permission values to the platform permission values associated with the file. The permission engine may provide the access rights to the file based on an affirmative result of the comparison.

26 Claims, 10 Drawing Sheets

| FSO ID | Trustee | Access Rights | Flags | Map Rules | |
|---|---|---|---|---|---|
| 123 | Bob | Read-Write | | 4865 | ... |
| 123 | Domain Users | Read | | 4866 | ... |
| 123 | web-server | Read-Write | | 4865 | ... |
| 123 | Everyone | Read | | 4868 | ... |
| 123 | Bob | Full Control | OI CI | 4869 | ... |
| 123 | Domain Admins | Full Control | OI CI | 4870 | ... |
| 123 | root | Full Control | | 4871 | ... |
| ... | | ... | ... | 4872 | ... |
| 134 | Bob | Read-Write | | 4865 | ... |
| 134 | Bob | Full Control | OI CI | 4874 | ... |
| 134 | Domain Admins | Full Control | OI CI | 4875 | ... |

DYNAMIC PERMISSION MODES

TECHNICAL FIELD

The present invention relates generally to file systems, and more particularly, but not exclusively, to managing file permission and access control in a distributed file system environment.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. In many cases, distributed file systems may be accessed from client systems that may have different or mismatched permission or access control semantics. Reasonable users may expect file system object permissions or access control semantics that are (or appear to be) consistent with the permissions or access control semantics native to client system they are working with. In some cases, the mismatch of permission or access control semantics across client systems may cause undesirable results that confuse or frustrate users of distributed file system. Also, the incompatibilities between different permission systems may result in arbitrary or inconsistent standards for mapping between different permission systems. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
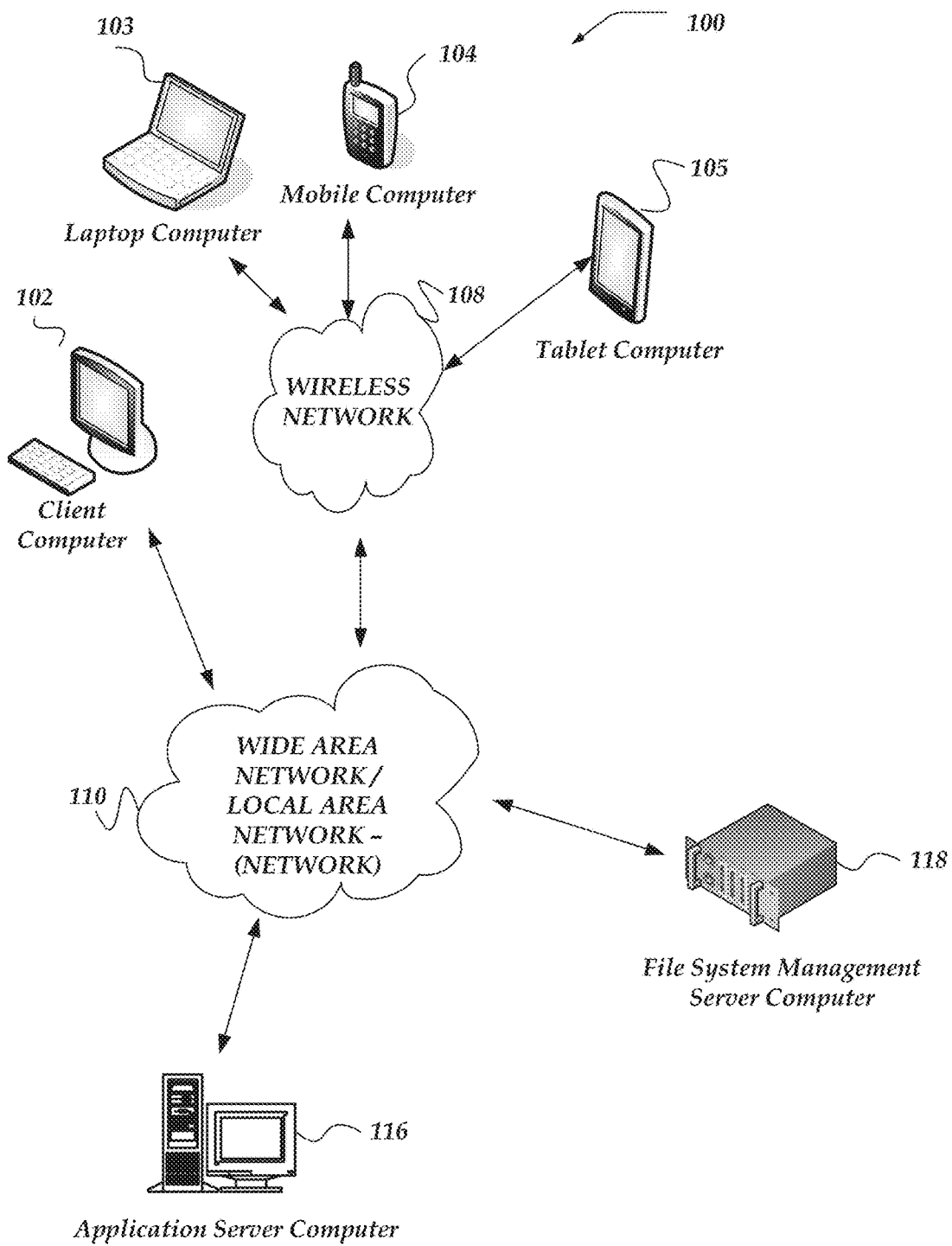
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object," or "object" refer to entities stored in a file system. These may include files, directories, folders, blocks, or the like. In this document for brevity and clarity all objects stored in a file system may be referred to as file system objects.

As used herein the term "file system object permissions," or "permissions" refer to features of file systems related to managing or controlling the access rights for various file system objects in the file systems. Herein, the term permissions is assumed to encompass the different terms used by various file systems to refer to file system object permissions, such as, access control lists, access control entries, permission modes, permission values, or the like. In some cases, different computer operating systems or file systems may define or enforce different permission semantics.

As used herein the term "native permissions," or "native permission scheme" refer to file system object permissions values, features or semantics that are native to a given operating system or file system. Note, in some cases, an operating system or file system may support more than one native permission scheme.

As used herein the term "client native permissions," or "client native permission scheme" refer to file system object permission schemes supported or used by clients of a file system. In some cases, the client native permission schemes may be different than the permissions used by other client systems or the distributed file system.

As used herein the term "platform permissions," or "platform permission scheme" refer to file system object permission values, features or semantics used by a distributed file system. Note, in some cases, platform permissions may support permission values, features or semantics that may differ from one or more of the clients that store or access file system objects that are stored in a file system.

As used herein the term "permission value" refers to a value that represents an access right or privilege of with a permission scheme. These may include values that represent access rights or access privileges, such as, read, write, move, create, delete, copy, link, unlink, or the like, or combination thereof. File system objects may be associated with one or more permission values. Different permission schemes may support the different access rights or access privileges. Accordingly, different permission schemes may have different permission values.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system. In one or more of the various embodiments, a file system engine may be instantiated to perform actions for managing data in a file system, as described below.

In one or more of the various embodiments, the file system engine may be arranged to provide a file system that includes one or more file system objects such that the one or more file system objects may be accessible by two or more clients that use different native permission schemes.

In one or more of the various embodiments, the file system engine may be arranged to receive, from a client, an access request that may be associated with the one or more file system objects such that the access request may include one or more native permission values that may be supported by the client.

And, a permissions engine may be instantiated to perform actions for managing data in a file system, as described below.

In one or more of the various embodiments, the permissions engine may be arranged to determine one or more map rules based on one or more characteristics of the access request such that the one or more map rules may include computer readable instructions that map native permission values to platform permission values from a platform permission scheme.

In one or more of the various embodiments, the permission engine may be arranged to execute the one or more map rules to provide one or more platform permission values based on the one or more native permission values such that the one or more platform permission values are associated with the one or more file system objects, and such that the platform permission scheme reduces latency and improves efficiency of computing resources employed to access the one or more file system objects by replacing use of the two or more different native permission schemes to define access rights to the one or more file system objects.

In one or more of the various embodiments, providing the one or more requested platform permission values may include executing one or more mapping rules to convert between the platform permission values and the native permission values, wherein the platform permission values that are unsupported by a client's native permission scheme are omitted from the one or more requested platform permission values. In one or more of the various embodiments, the one or more requested platform permission values may be based on the platform permission scheme and the native permission values included in the access request.

In one or more of the various embodiments, providing the one or more platform permission values, may include: providing one or more joint platform permission values that are supported by each of the two or more clients; and providing one or more disjoint platform permission values that are supported by a portion of the two or more clients.

In one or more of the various embodiments, the permission engine may be arranged to compare one or more requested platform permission values to the platform permission values associated with the one or more file system objects In one or more of the various embodiments, the comparison, may include: iterating over the one or more platform permission values; and determining the access rights to the one or more file system objects based on a first platform permission value that matches the access request. In one or more of the various embodiments, the comparison may include: communicating with a separate service to confirm one or more characteristics of the client or the access request; and modifying the provided access rights based on a response to the communication.

In one or more of the various embodiments, the permission engine may be arranged to provide the access rights to the one or more file system objects based on an affirmative result of the comparison.

In one or more of the various embodiments, the file system engine may be arranged to perform further actions, including: receiving a request from the client to store a file system object in the file system, wherein the file system object is associated with one or more native permission values; and employing the permissions engine to associate one or more inheritable platform permission values to the file system object based on the platform permission values that are associated with a parent file system object or a container file system object associated with the file system object.

In one or more of the various embodiments, the permissions engine may be arranged to provide one or more other requested permission values included in another access request from another client such that the other access request is associated with the one or more file system objects, and wherein the one or more other requested permission values are unsupported by the native permission scheme used by the client. And, in some embodiments, associating the one or more requested permission values and the one or more other permission values with the one or more file system objects.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, file system management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by file system management server computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 116 or file system management server computer 118 are described in more detail below in conjunction with FIG. 3. Although FIG. 1 illustrates application server computer 116 and file system management server computer 118 each as a single computer, the innovations or embodiments are not so limited. For example, one or more functions of application server computer 116, file system management server computer 118, or the like, may be distributed across one or more distinct network computers. Moreover, in one or more embodiments, file system management server computer 118 or file system management server computer 120 may be implemented using a plurality of network computers. Further, in one or more of the various embodiments, application server computer 116, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
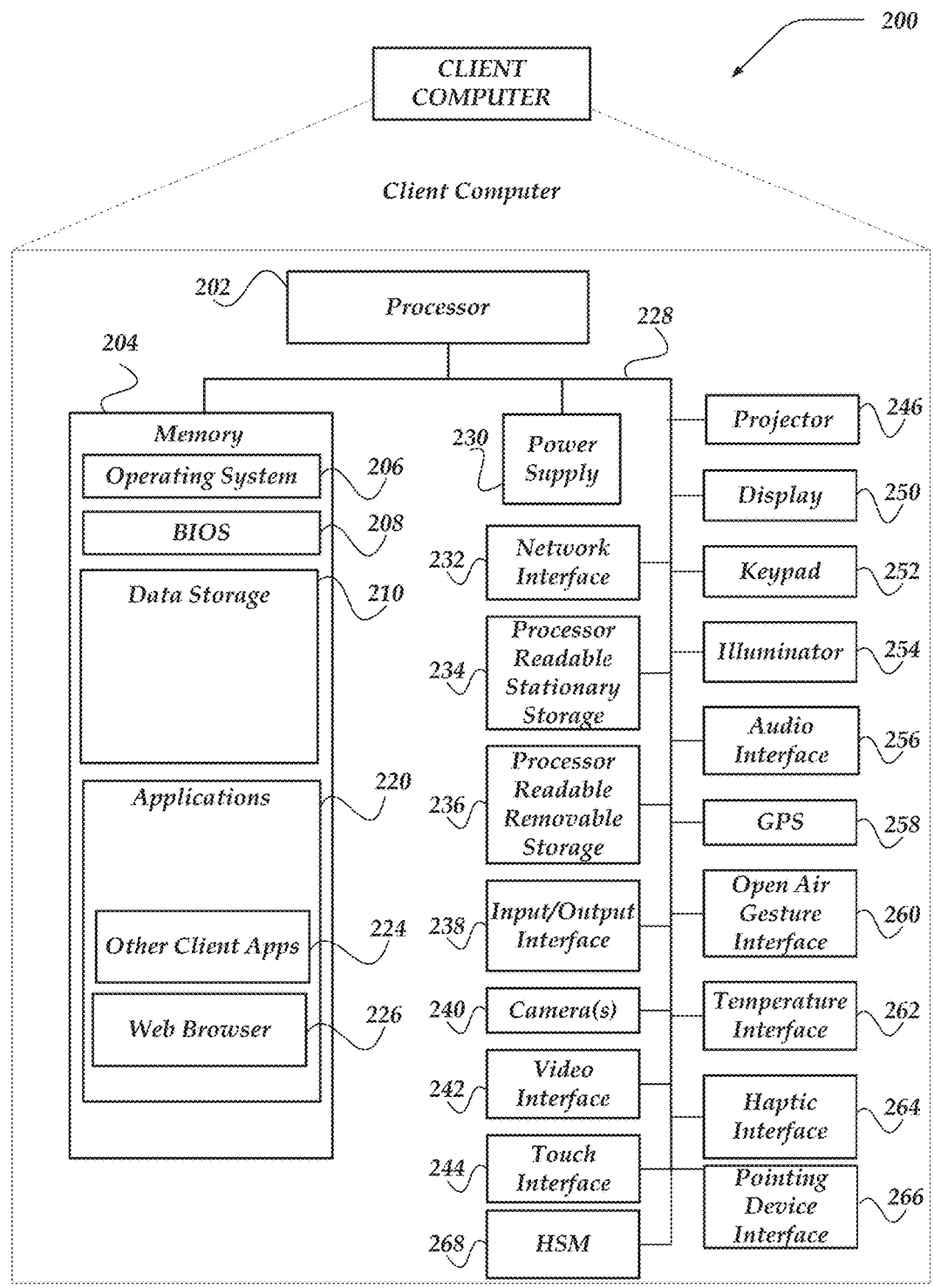
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in file system object meta-data, file system objects, file systems, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX', or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, file system operations, file system administration, file access, queries, searches, messages, notification messages, event messages, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
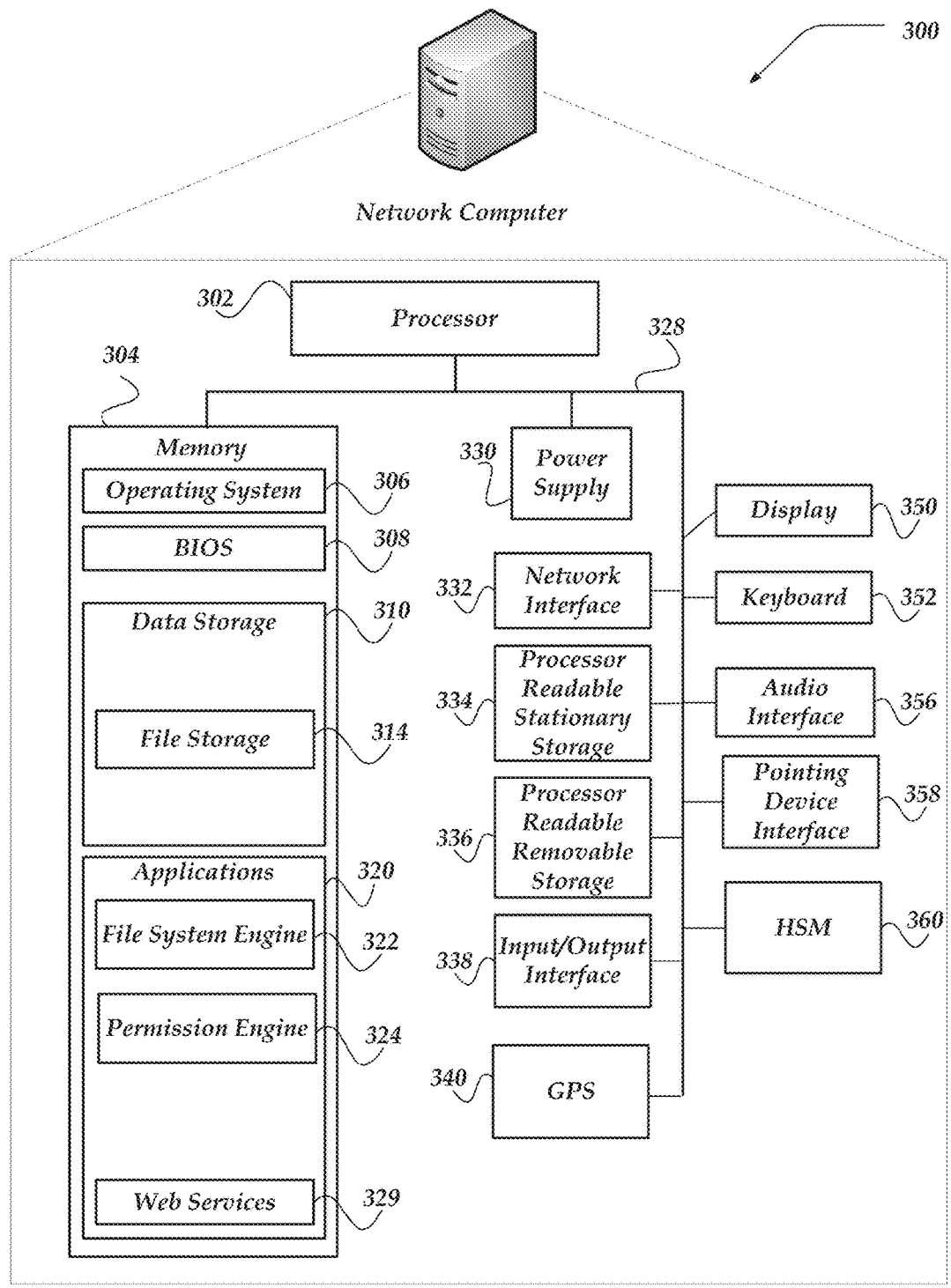
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or file system management server computer 118 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, permissions engine 324, web services 329, or the like, may be arranged to employ geo-location information to select one or more localization features, such as, time zones, languages, currencies, currency formatting, calendar formatting, or the like. Localization features may be used in file system meta-data, file system objects, file systems, permissions, user-interfaces, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, or the like. File storage 314 may store files, documents, versions, properties, permissions information, file meta-data, data structures, or the like, that represent one or more portions of a distributed file system.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, permissions engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, permissions engine 324, web services 329, or the like, may be operative in a cloud-based computing environment. In one or more of the various embodiments, these applications, and others, that comprise the management platform may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, permissions engine 324, web services 329, or the like, may be provisioned and de-commissioned automatically.

Also, in one or more of the various embodiments, file system engine 322, permissions engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
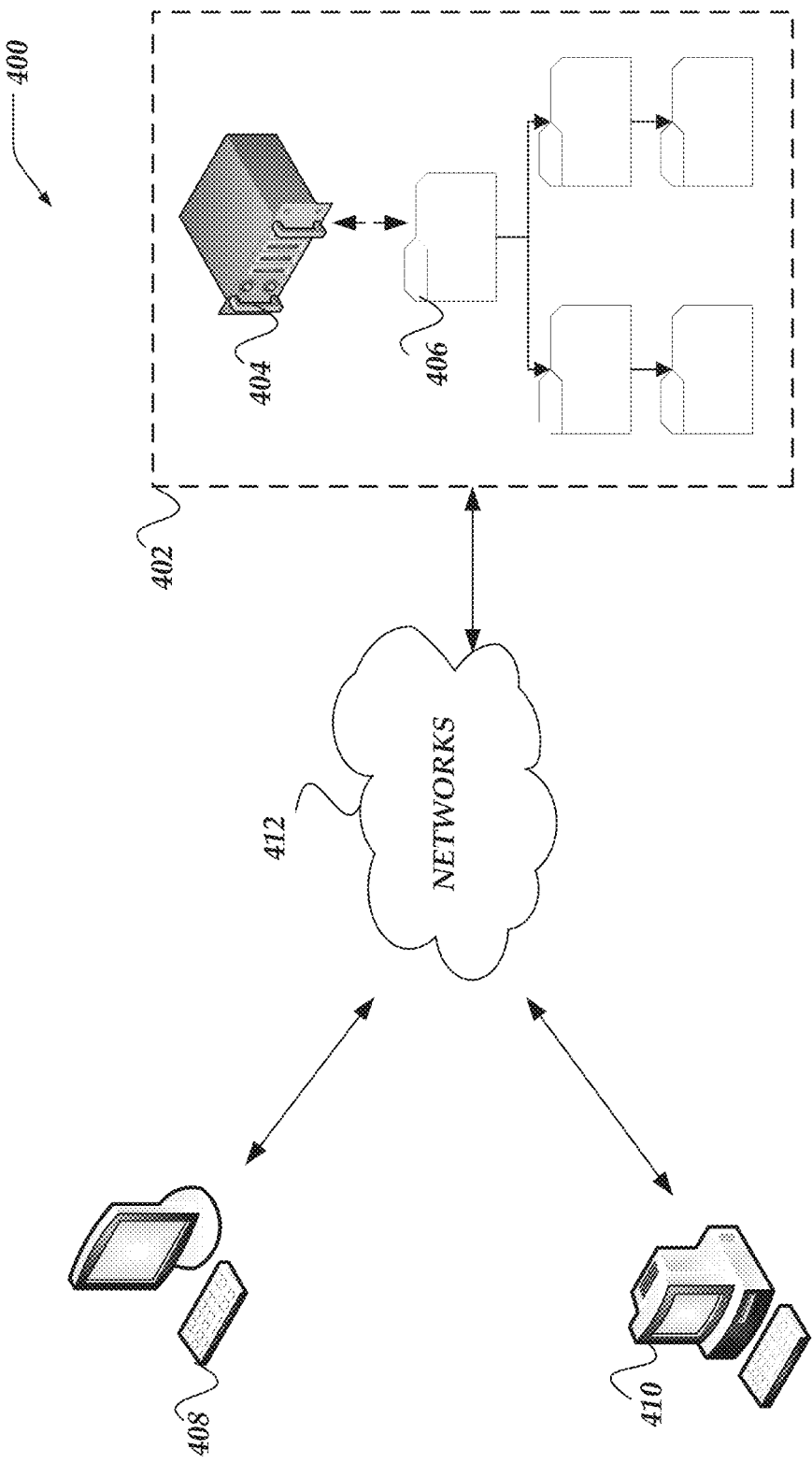
FIG. 4 illustrates a logical architecture of a system for dynamic permission modes for secure distributed file systems in accordance with one or more of the various embodiments.

FIG. 4 illustrates a logical architecture of system 400 for dynamic permission modes for secure distributed file systems in accordance with one or more of the various embodiments. In one or more of the various embodiments, file systems, such as, file system 402 may be arranged to be communicatively coupled to one or more networks, such as, networks 412. Accordingly, in one or more of the various embodiments, one or more clients, such as, client computer 408 and client computer 410 may be arranged to access file system 402 over networks 412. In some embodiments, clients of file system 402 may include users, services, programs, computers, devices, or the like, that may be enabled to perform one or more file system operations, such as, creating, reading, updating, or deleting data (e.g., file system objects) that may be stored in file system 402. In some embodiments, file system 402 may comprise one or more file system management computers, such as file system management computer 404. Also, in one or more of the various embodiments, file systems, such as file system 402 may include one or more file system objects, such as file system object 406 that may represent the various objects or entities that may be in file system 402. In some embodiments, file system objects may include, blocks, files, documents, directories, folders, change records, file system journals, backups, snapshots, replication information, versions, branches, or the like.

In one or more of the various embodiments, the implementation details that enable file system 402 to operate may be hidden from clients, such that they may be enabled to use file system 402 the same way they use other file systems, including local file systems. Accordingly, in one or more of the various embodiments, clients may be unaware that they are using a file system that supports permission rules or permission semantics that differ from their native permissions because file system engines or permissions engines may be arranged to mimic the interface or behavior of native file systems used by the clients.

Also, while file system 402 is illustrated as using one file system management computer each with one set of file system objects, the innovations described herein are not so limited. Innovations herein contemplate file systems that include one or more file system management computers or one or more file system object data stores. In some embodiments, file system object stores may be located remotely from one or more file system management computers. Also, a logical file system object store or file system may be spread across two or more cloud computing environments, storage clusters, one or more on-premises servers, or the like, or combination thereof.

In one or more of the various embodiments, client computer 408 and client computer 410 may be considered to have native file systems or at least native permission modes that may support permission semantics that may be different or inconsistent with each other. Accordingly, in one or more of the various embodiments, some permission semantics used or expected by client computer 408 may be different than permission semantics used or expected by client computer 410.

In one or more of the various embodiments, a user of client computer 410 may configure permissions for one or more file system objects stored in file system 402. Accordingly, those same file system objects may later be accessed via client computer 408 which may be assumed in this example to have native permissions that have different value, semantics, or features than the native permissions of client computer 408. For example, client computer 408 may rely on file permission values while client computer 410 may use access control lists. Thus, in one or more of the various embodiments, one or more clients may attempt to associate file system objects with permission values or permission modes that may be incompatible or inconsistent with native permission schemes of one or more other clients. However, in one or more of the various embodiments, clients having a particular native permission scheme may be arranged to access file system objects stored in file system 402 that were assigned permission values from a different permission scheme.

Accordingly, in one or more of the various embodiments, a permissions engine running on a file system management computer, such as, file system management computer 404 may be arranged to manage the mismatches between native permission schemes. In one or more of the various embodiments, permissions engines may be arranged to dynamically reconcile differences between two or more of the various native permission schemes of the various clients that may be accessing a distributed file system.

In one or more of the various embodiments, permissions engines may be arranged to ensure that access rights established under one native permission scheme are honored by clients that use a different native permission scheme. Accordingly, in one or more of the various embodiments, permissions engines may be arranged provide a platform permission scheme that may be used internally by a distributed file system. In some embodiments, platform permission values that comprise a platform permission scheme may be a super-set of one or more native permission schemes recognized or supported by the file system.

Also, in one or more of the various embodiments, the permissions engine may be arranged to map platform permission values to client native permission values while preserving permission information that may be meaningful to some client types and not others. For example, a first client type may support richer or more detailed permission semantics that a second type of client. Accordingly, if a first client type assigns native permission values that are unknown or irrelevant to a second client type to a file system object, the permissions engine may preserve the first native permission values in the platform permissions associated with the file system object. If a first type of client accesses the file system object, the permissions engine may be arranged to map one or more platform permission values to one or more first native permission values including permission values that are inconsistent with other native permission schemes used by different client types.

Likewise, in some embodiments, if a client attempts to access a file system object that is associated with one or more platform permission values that are not recognized or compatible with the client as well as other platform permission values that the client supports, the permissions engine may map the platform permission values associated with the file system object to the native permission values recognized by the client while preserving platform permission values that are not supported by that client.

However, the variety of permission systems (e.g., different native permission systems) as well as the variety of file system use cases has impeded the development of a generalized permission mode standard. Further, even if there is a generally accepted standard for mapping between the permission modes supported by different permission systems, there are likely to be cases where a static pre-defined standard may be disadvantageous for one or more local conditions or circumstances.

Accordingly, in one or more of the various embodiments, permission engines may be arranged to employ dynamic permission modes to map between native permission modes and platform permissions modes. In one or more of the various embodiments, map rules for dynamic permission modes may comprise computer readable instructions, Application Specific Integrated Circuits (ASICs), Field Programmable Gate Arrays (FPGAs), Programmable Array Logic (PAL), or the like, or combination thereof.

In one or more of the various embodiments, dynamic permission modes enable permission engines to map native permission modes to platform permission modes using semantics, conditions, or the like, that meet the requirements of an organization. In some embodiments, dynamic permission modes may include executable rules that may be evaluated in real-time for some or all access requests.

Figure 5:
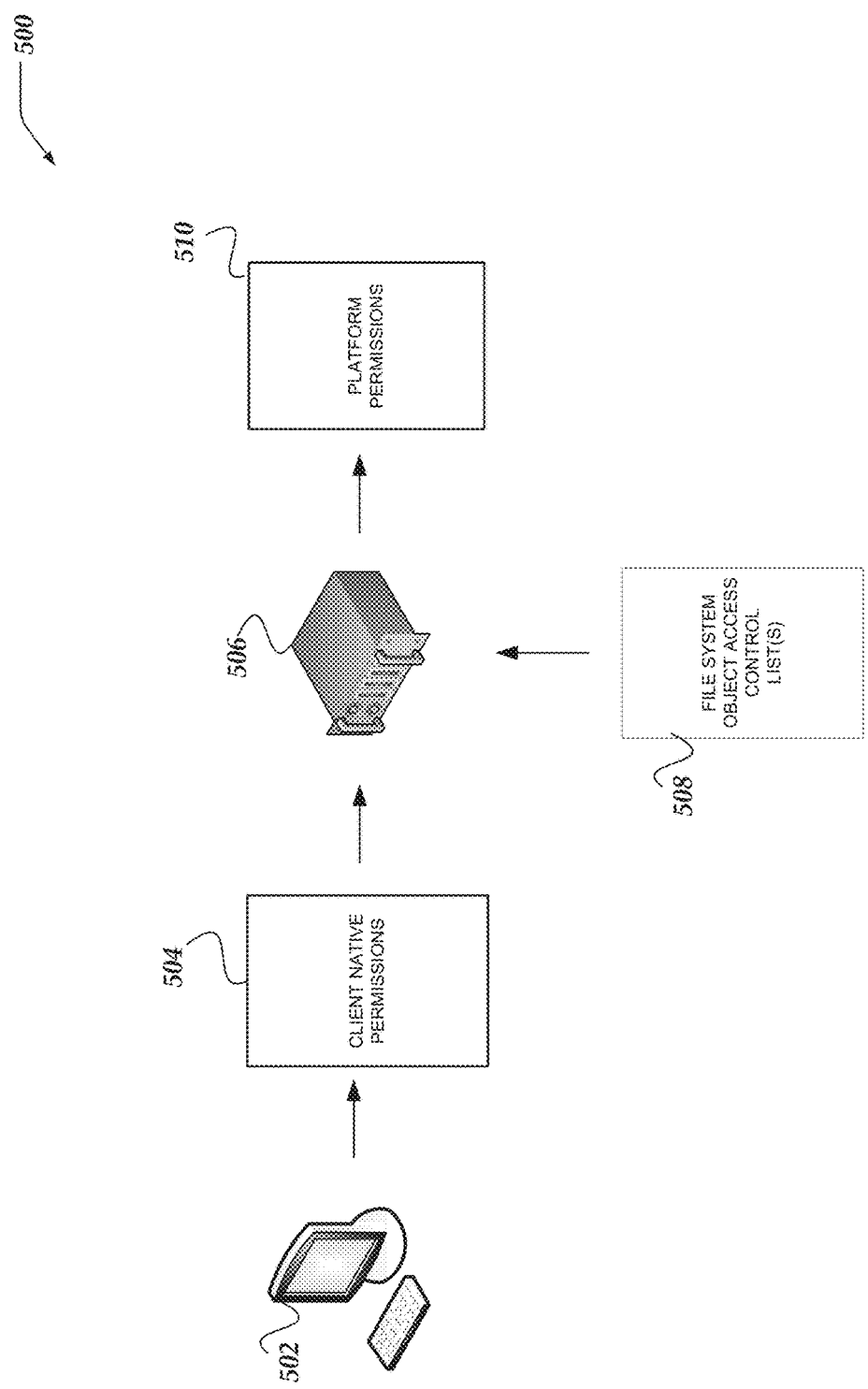
FIG. 5 illustrates a portion of a logical architecture of a system for dynamic permissions modes in accordance with one or more of the various embodiments.

FIG. 5, illustrates a portion of a logical architecture of system 500 for dynamic permissions modes in accordance with one or more of the various embodiments. In one or more of the various embodiments, file system 500 may include client computer 502, one or more native permission modes 504, file system management computer 506, one or more file system object permissions 508, one or more platform permission modes 510, or the like. In this example, it may be assumed that client computer 502 uses native permissions that may be different that platform permissions.

Also, in one or more of the various embodiments, one or more file system objects may be associated with platform permission modes that are associated with the one or more file system objects and stored in a distributed file system. Accordingly, in one or more of the various embodiments, file system object ACLs, such as file system object ACLs 508 may be associated one or more file system objects. In one or more of the various embodiments, ACLs 508 may represent the data structures used to store or represent the platform permission values associated with one or more file system objects that may be associated with an access request provided by client computer 502.

In one or more of the various embodiments, native permissions 504 represents the data structures used to store or represent the native permission values for client 502 that may be associated with a file system object and a file access operation.

In one or more of the various embodiments, if client 502 accesses or attempts to access file system objects in the distributed file system, a permissions engine running on server 506 may be arranged to map between the platform permissions associated with the operation (e.g., platform permissions 510) and native permissions 504.

In one or more of the various embodiments, permissions engines may be provided various credential information from the users or services on client 502 that may be attempting to access one or more file system objects. In one or more of the various embodiments, permissions engines may use the credential information, native permissions 504, file system access control lists 508, and platform permissions 510 to determine access rights for the users or services attempting access to file system objects. Upon determining the access rights, the permissions engine may enforce access rights for clients making the request for access.

In one or more of the various embodiments, if a user (or service) via a client tries to access a file system object it may provide information (field values, flags, or the like) to the permissions engine that indicates the access rights requested by the user or the access rights that may be available to the user. In some embodiments, the permissions engine may be provided information that enables it to look up users access rights from other services, such as, a LDAP servers, access rights directories/databases, or the like. Likewise, in some embodiments, a permissions engine may be arranged employ one or more external services to confirm or validate credential information before providing access rights. In one or more of the various embodiments, the conditions for requiring such additional credential verification/validation may be vary depending the clients, file system objects, the requested access, or the like. The particular rules or conditions may be provided to a permissions engine via configuration information, policy rules, user-input, or, the like, or combination thereof.

In one or more of the various embodiments, the permissions engine may be arranged to map the requested native access rights which may be described in terms of a client native permission values to platform permission values. In one or more of the various embodiments, the mapping may be arranged to avoid modifying the scope, semantics, or breadth of the requested native access rights.

In one or more of the various embodiments, the permissions engine may compare the platform permissions to the access rights requested by the user. In some embodiments, the permissions engine may be arranged to scan the platform permission values to determine if any of the platform permission values associated with file system object match the rights requested by the user. Note, in some embodiments, this comparison may include testing one or more conditions or rules that may be associated with a permission level. For example, some native permissions systems may be richer or more complex than others. Accordingly, in some embodiments, platform permissions may include support for both richer permission systems, such as, access control lists, as well as, less flexible or less granular permissions systems such as Unix/POSIX-type permissions.

In one or more of the various embodiments, if the permissions engine determines that a file system object is associated with platform permission values that allow the access rights the user is requesting, it will allow the requested access to the requested file system object. Note, as used herein access means or includes requests to read, create, move, update, delete, copy, change permissions, link, unlink, or the like, or combination thereof.

In one or more of the various embodiments, some file system objects, such as, those representing directories or folders may be associated with the same permission values used for files as well as some permission values designed specifically for file system objects that contain other objects, such as, folder or directories. In some embodiments, these permission values may include permission inheritance rules. For example, in one or more of the various embodiments, a directory file system object may be associated with a permission value that indicates that all file system objects stored in the container should be assigned particular permission values. Likewise, in some embodiments, some native permission values may enable container file system objects to be associated with inheritable permission values that require sub-folders or sub-directories or a given folder or directory to be assigned the same permission values as its parent object. Further, in one or more of the various embodiments, some native permission values may enable or require one or more native permission values to be assigned automatically to child objects where the assigned permission values are not necessarily the same as the permission values for its parents.

In one or more of the various embodiments, permissions engines may be arranged to preserve permissions information (using platform permissions) to prevent clients that may use different native permission schemes from overwriting permission values that may be meaningful to other clients using other native permission schemes.

For example, one native permission scheme may support associating file system object access rights to lists of individual users while another native permission system may just support setting permissions for a group, where membership in the group as maintained or understood by the client that enabled those access rights. Accordingly, for example, an admin with super user access rights at a first client, say client 504, may assign a list of users read access rights for a file system object, such as, file system object 510, that are stored in platform permissions 508. Another, admin user on a second client, such as, client 506 may assign read rights for the same file system object to a user group rather than to specifically named users. In this example, the permissions engine will maintain both types of access rights for the same file system object.

Accordingly, in this example, if a user of the first client requests to access file system object 510, the permissions engine may be arranged to confirm that the user has explicit access rights to the file system object before granting access. In this example, the permissions engine compares the requested access rights with the platform permission values associated with file system object 510 to find a first match, if any, that may match the request. Likewise, if a user of the second client requests access the same file system object, a permissions engine may determine if the user is in the group that has been assigned access rights via the second client. However, the since second client (client 506) may provide the permissions engine a username as well as the users group name, the permissions engine may determine that the user has rights based on the permissions set by the first client (client 504) if the username provided by the second client matches a username assigned rights by the first client rather than testing the group membership of the user.

Figure 6:
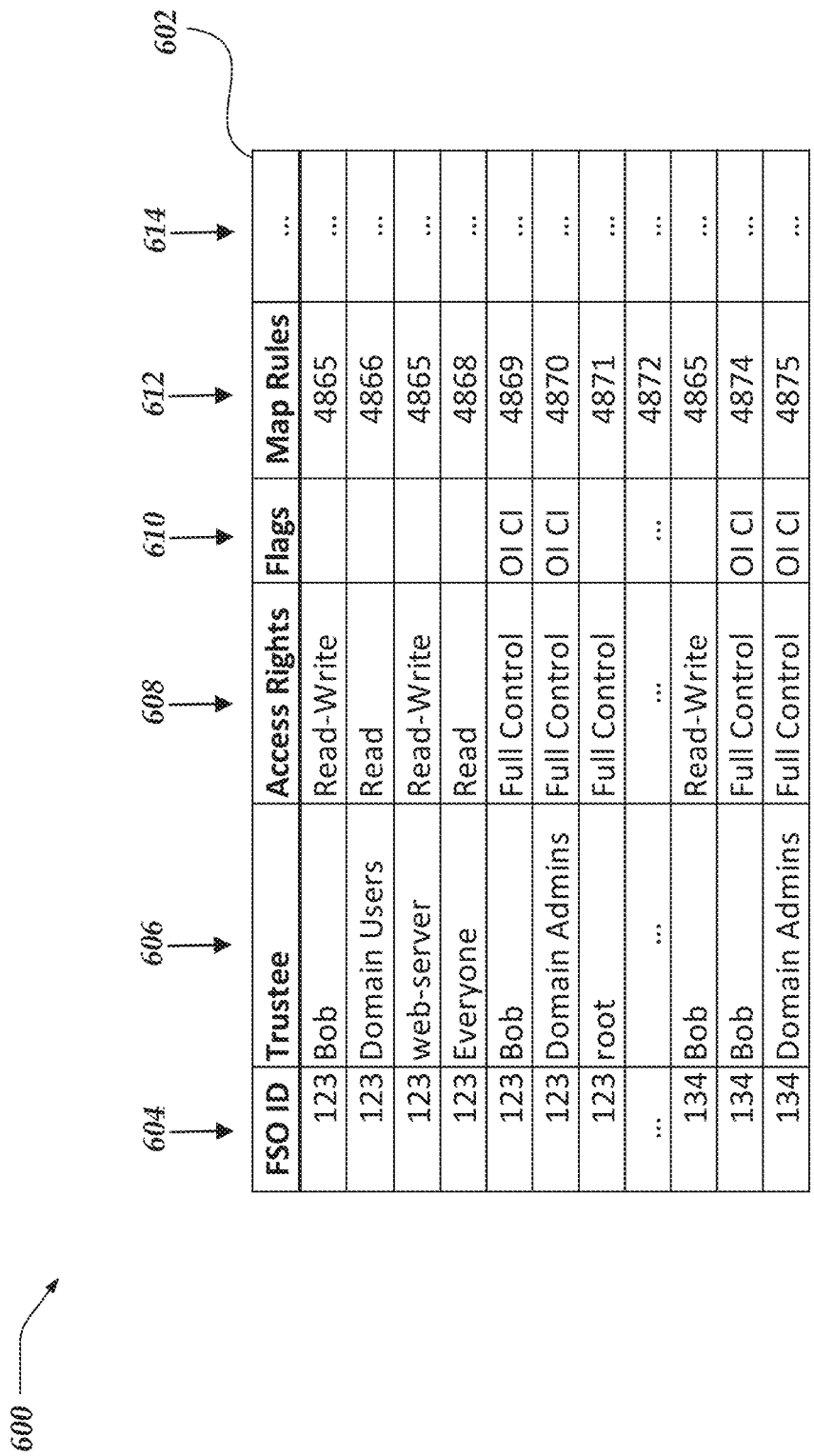
FIG. 6 illustrates a logical representation of a data structure for representing platform permission values in accordance with one or more of the various embodiments.

FIG. 6 illustrates a logical representation of data structure 600 for representing platform permission values in accordance with one or more of the various embodiments. In one or more of the various embodiments, permissions engines may be arranged to track permissions associated with file system objects using platform permission values. In one or more of the various embodiments, one or more platform permission values may be associated with each file system object. In one or more of the various embodiments, platform permissions may be organized using various data structures. Data structure 600 is one example of a data structure that may be used for associating platform permission values with file system objects.

In one or more of the various embodiments, data structure 600 may include data object 602 that includes several properties. In this example, for clarity and brevity data object 602 is represented using tabular format. However, one of ordinary skill in the art will appreciate that various data structures having the same, more, or less properties arranged in different formats or order may be used without departing from the scope of the innovations described herein.

In one or more of the various embodiments, a data object for managing platform permissions, such as, data object 602, may include properties, such as, file system object identifier 604, trustee 606, access rights 608, flags 610, map rules 612, additional properties 614, or the like.

In one or more of the various embodiments, file system object identifier 604 may represent an identifier that may be used to reference the data or other meta data associated with file system object. In one or more of the various embodiments, trustee 606 represents the user, group, or the like, associated with the access rights. In one or more of the various embodiments, access rights 608 represent platform permission values associated with a trustee and an file system object. In one or more of the various embodiments, flags 610 represent permissions meta-data, map rules 612 represent one or more rules or references to one or more rules that may be executed to map between one or more native permissions and platform permissions, and additional properties 614 simply illustrates that data object 602 may include various additional properties that store other information about the platform permission value item or the file system object. For example, in one or more of the various embodiments, additional properties 612 may include additional conditions or rules associated with a platform permission value items, such as, defining which days a platform permissions may be enforced or it may define limitations regarding access to a file system object based on the location or source of the request, such as, on-premises access only versus access from clients outside the internal network.

In one or more of the various embodiments, flags 610 may include values that represent permission inheritance rules for inheritable permission values. For example, some native permission schemes may support permission values that are inheritable by other related file system objects, such as, files stored in a particular folder, or sub-folders of particular folders. Accordingly, for example, if a folder is associated with one or more permission values that may be inheritable, files stored in that folder should automatically inherit those permission values.

In one or more of the various embodiments, permissions engines may be arranged to scan data objects, such as data object 602 to identify if a user or client has the requested or required access rights for a given file system object. The permissions engine may scan data object 602 until it encounters platform permission values that satisfy the access rights requested by the client. In this example, permissions engines may be arranged to scan the items in data object 602 for a given file system object. For example, if a client is requesting read access to file system object 123 (See, FSO ID 604) for a user named Bob, the first item will satisfy the request, enabling the permissions engine to authorize read-access to file system object 123 for Bob.

In one or more of the various embodiments, if the permissions engine does not satisfy the access request with user-level permissions, it may look for less specific permissions attributes, such as, group permissions.

In this example, if Chris is requesting access to file system object 123, the permissions engine will not find user-level access permissions for Chris in data object 602. Accordingly, in one or more of the various embodiments, the permissions engine may check for group level permissions that provide a user access rights based on their group membership or role. In this example, data object 602 indicates that if Chris is a member of Domain Users group, Chris would qualify for read access for file system object 123.

In one or more of the various embodiments, the map rules associated with an entry in data object 602 may be referenced using identifiers associated with a file system object, access control entry, access control list, or the like. In this example, data object 602 stores referential identifiers in map rules property 612 that may be used to lookup or identify one or more map rules for enabling dynamic permission modes. In some embodiments, the identifier may point to a rule or ruleset that include one or more rules for mapping one or more native permission modes to one or more platform permissions mode.

In one or more of the various embodiments, map rules may be associated with users, groups, portions of the file system (e.g., particular shared or remote directories), or the like. In some embodiments, one or more individual users may be associated with individual map rules. Also, in some embodiments, one or more characteristics of a user (e.g., role, geographic location, status, or the like) may determine the map rules for a user.

In one or more of the various embodiments, characteristics of the one or more file system objects may determine the map rules for a given access request. For example, files that contain sensitive or valuable information may be assigned different map rules than files that contain non-sensitive or low valued content.

In one or more of the various embodiments, as described above, map rules for dynamic permission modes may comprise computer readable instructions, Application Specific Integrated Circuits (ASICs), Field Programmable Gate Arrays (FPGAs), Programmable Array Logic (PAL), or the like, or combination thereof.

Figure 7:
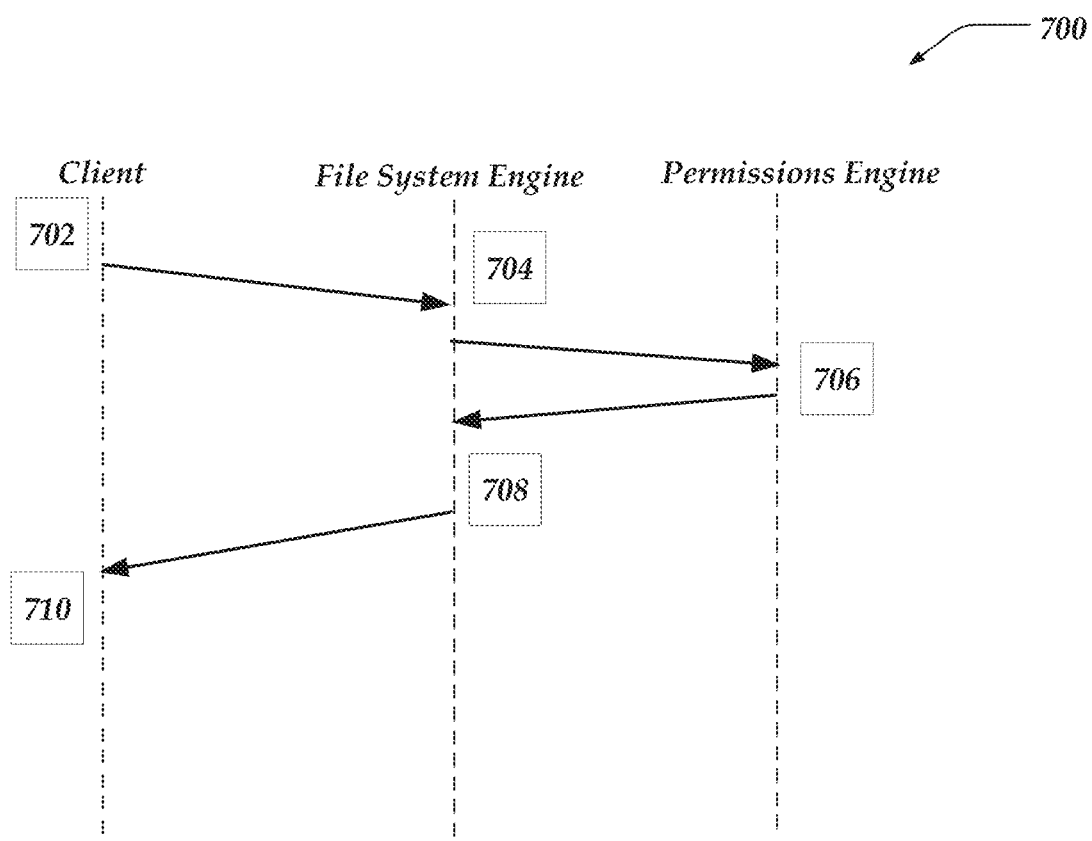
FIG. 7 illustrates a sequence for employing dynamic permission modes in accordance with one or more of the various embodiments.

FIG. 7 illustrates sequence 700 for employing dynamic permission modes in accordance with one or more of the various embodiments. In this example, at step 702, a client may provide or generate an access request that may be associated with one or more file system objects in a file system that is arranged to use dynamic permission modes.

In one or more of the various embodiments, the access request may include operational information associated with the type of access that is being requested. In some embodiments, the access information may include an indication of the type of operation the client may be attempting, such as, read, write, delete, move, or the like. In some embodiments, the access operation information may include one or more client native permission modes that describe the level of access or the type of access the client is requesting.

At step 704, in some embodiments, a file system engine receive the access request from the client. In this example, the client may have provided permission modes or access right request information represented using client native permission modes. Accordingly, in one or more of the various embodiments, the file system engine may be arranged to resolve the mismatch between the native permissions associated with the request and the platform permission scheme used internally by the file system engine.

In some embodiments, before determining the client access rights the file system engine may require that the client native permission modes associated with the access request be mapped or otherwise converted to platform permission modes. Accordingly, in one or more of the various embodiments, the file system object may employ a permissions engine to determine the platform permission modes associated with the access request.

At step 706, in one or more of the various embodiments, a permission engine may be instantiated or employed to perform one or more actions to map the client native permission modes that are associated with the access request to platform permission modes.

In some embodiments, the permission engine may employ some or all of the information associated with the access request to identify or obtain one or more map rules or map rulesets that may be employed to map the client native permission modes to platform permissions modes.

In one or more of the various embodiments, the permission engine may be arranged to execute the determined map rules to map the client native permission modes associated with the access request to the appropriate platform permission modes. Note, because, different organizations may configure their map rules differently, the mapping between client native permission modes and platform permission modes may vary between organizations.

In some embodiments, one or more portions of the same distributed file system may be associated with different or separate permission mapping rules. For example, in some embodiments, one portion of a file system may be associated with map rules that map client native permissions to platform permissions one way, while another portion of the same file system may be associated with other mapping rules that map client native permission modes to platform permissions differently.

In one or more of the various embodiments, if the mapping of client native permission modes is complete, the result of the mapping may be provided to the file system engine. For example, the file system engine may be provided one or more data structures that include the data represent the platform permission modes that correspond to client's access request.

At step 708, in one or more of the various embodiments, the file system engine my resolve the access request based on the platform permissions provided by the permission engine. Accordingly, in some embodiments, the file system engine may provide the requesting client a response to the access request.

At step 710, in some embodiments, the requesting client may receive the access request response and proceed accordingly. For example, if the requested client native permission modes map to platform permission modes or platform access rights that are not available to the client (or the user initiating the request), the client may an access denied response that may be reported to the user.

Generalized Operations

Figure 8:
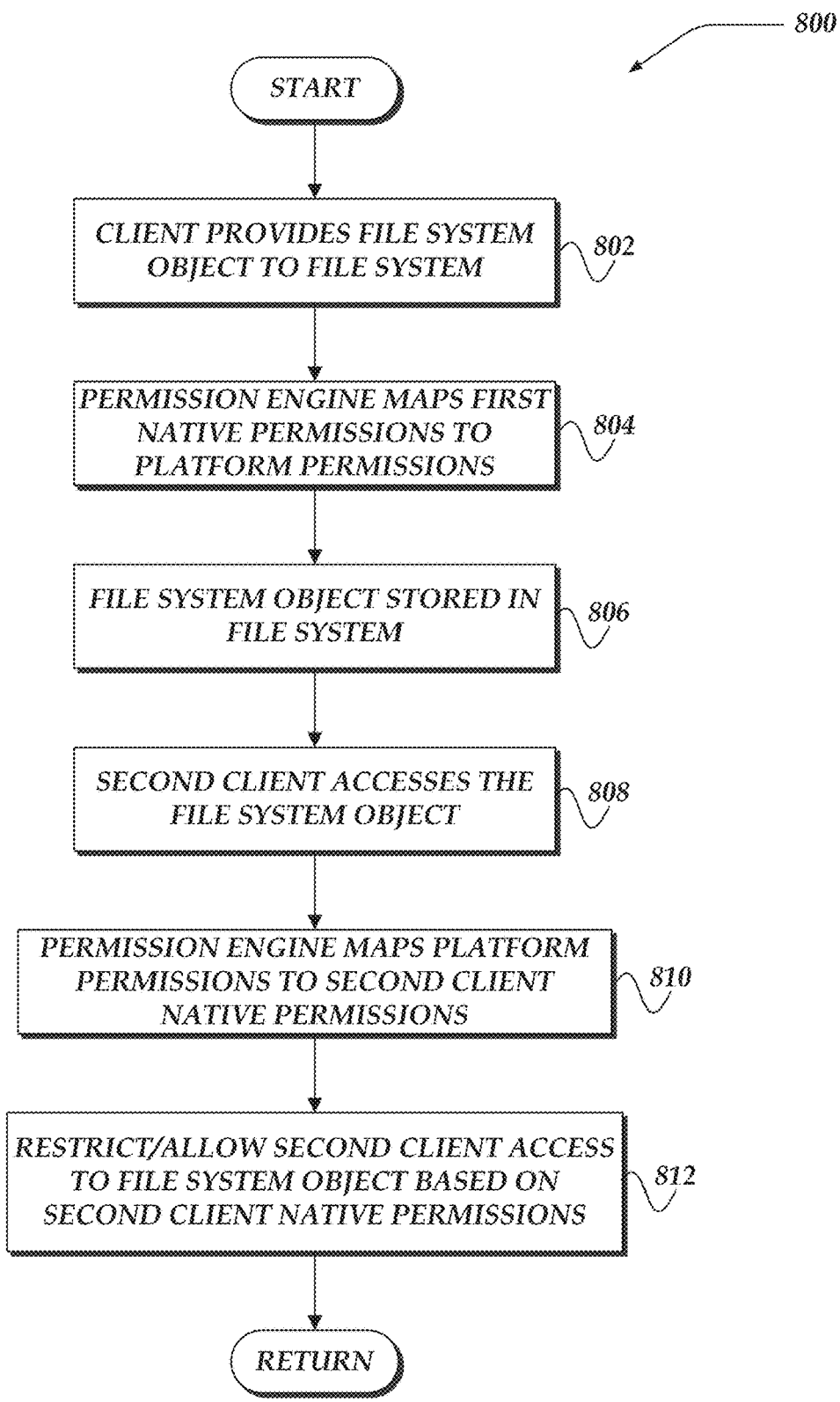
FIG. 8 illustrates an overview flowchart of a process for dynamic permissions mode in accordance with one or more of the various embodiments.
Figure 9:
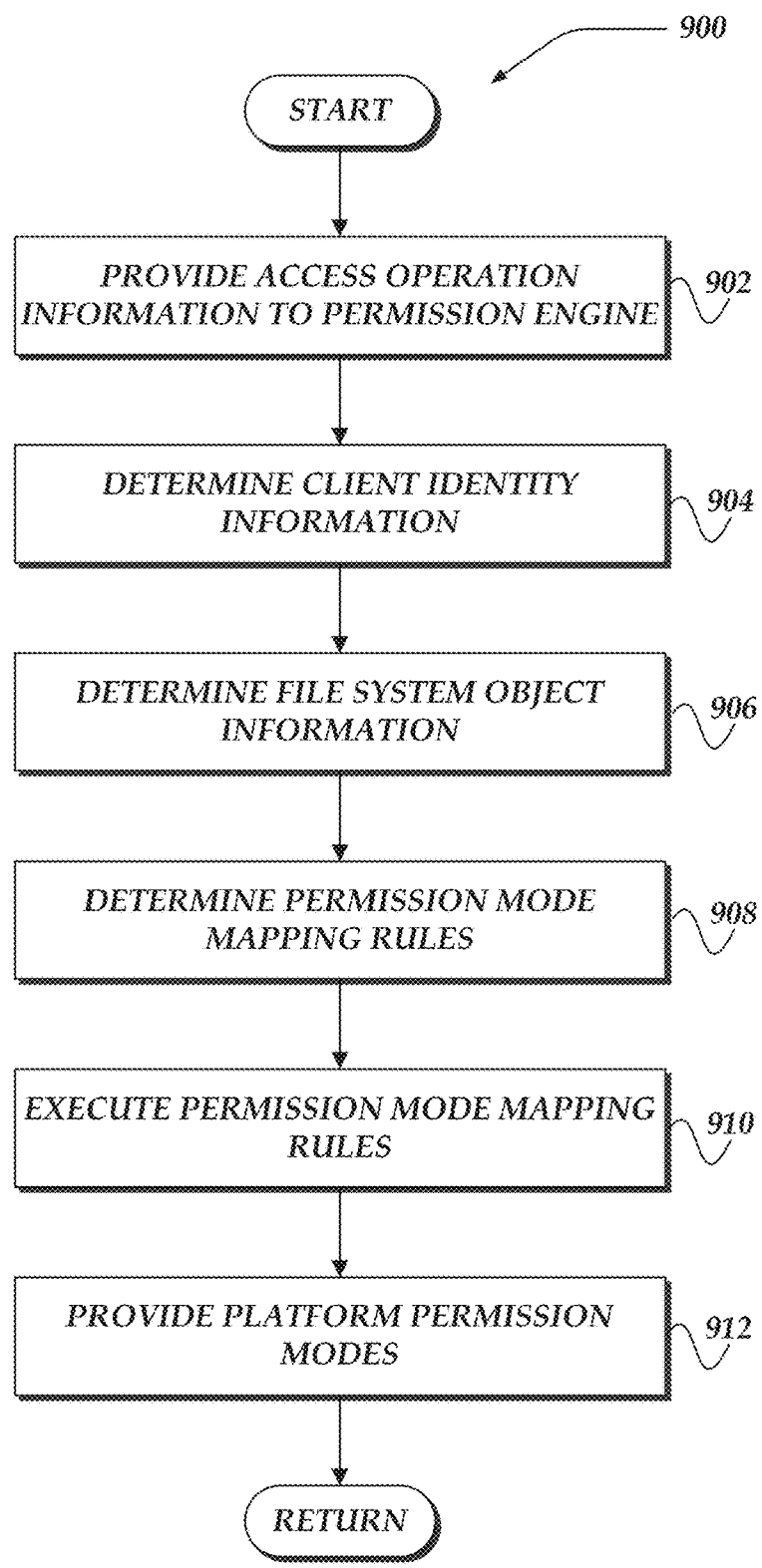
FIG. 9 illustrates a flowchart of a process for dynamic permissions mode in accordance with one or more of the various embodiments.
Figure 10:
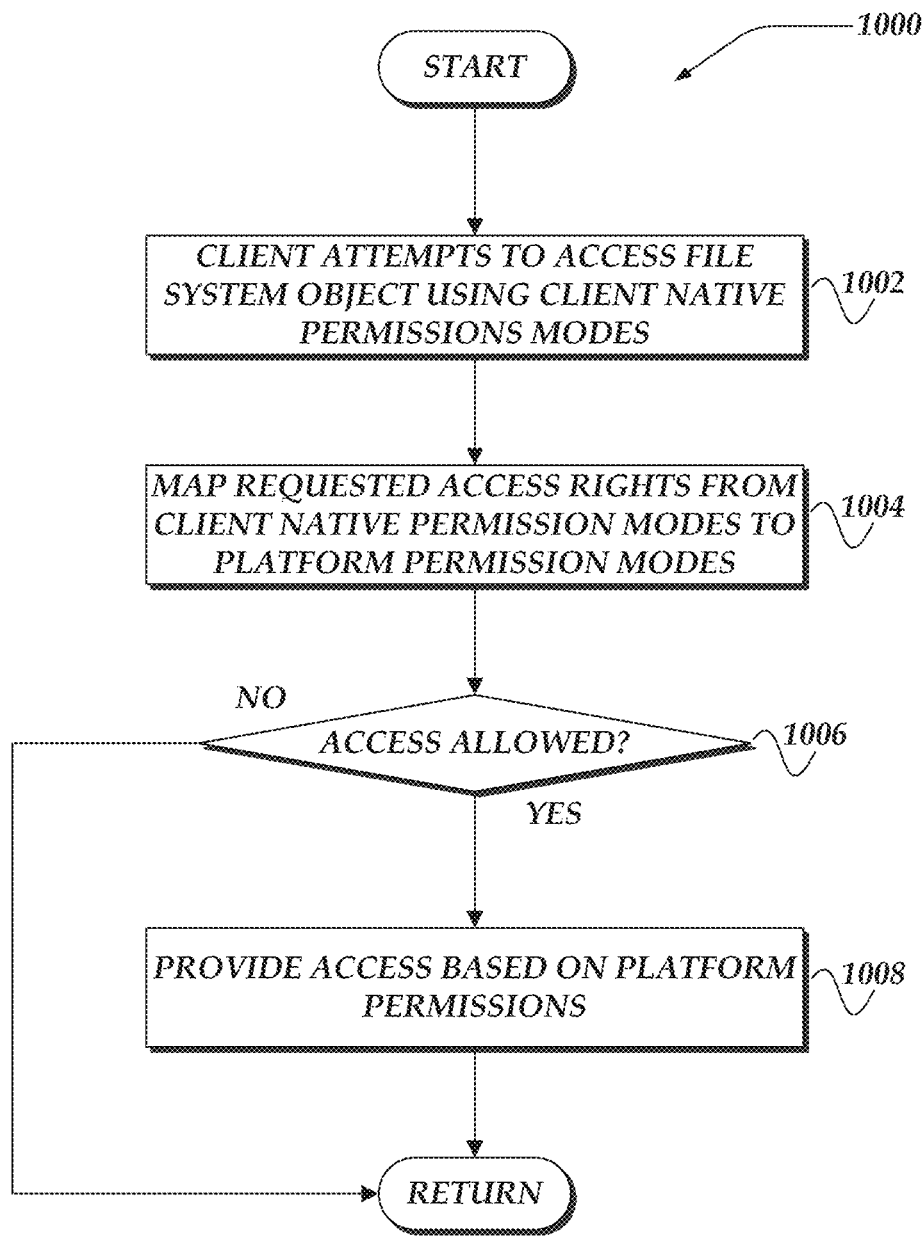
FIG. 10 illustrates a flowchart of a process for employing dynamic permissions mode to resolve permissions for client access attempts, in accordance with one or more of the various embodiments.

FIGS. 8-10 represent generalized operations for merged permissions modes in accordance with one or more of the various embodiments. In one or more of the various embodiments, processes 800, 900, and 1000 described in conjunction with FIGS. 8-10 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 8-10 may be used for dynamic permission modes in accordance with at least one of the various embodiments or architectures such as those described in conjunction with FIGS. 4-7. Further, in one or more of the various embodiments, some or all of the actions performed by processes 800, 900, and 1000 may be executed in part by file system engine 322, or permissions engine 324 running on one or more processors of one or more network computers.

FIG. 8 illustrates an overview flowchart of process 800 for dynamic permissions mode in accordance with one or more of the various embodiments. After a start block, at flowchart block 802, in one or more of the various embodiments, a first client may provide a file system object to a file system. In one or more of the various embodiments, as discussed above, if clients save or create file system objects, the clients may use permissions that are native to the applications or operating system running on the client. Accordingly, in one or more of the various embodiments, a client may associate native permissions with file system objects.

In one or more of the various embodiments, the operations originating from one or more clients may be supplemented with meta-data that may be obtained at the client before the access request may be communicated to the file system engine or permissions engine. For example, information associated with the file system operation (e.g., user identity information information) may be collected from the client before the access request is provided as meta-data to the file system engine or permissions engine that may handle the access request.

Also, in one or more of the various embodiments, the file system engine or permissions engine may be arranged to lookup or otherwise obtain additional meta-data associated with the requested file system access. For example, in one or more of the various embodiments, a permissions engine may lookup user information from one or more databases or services to confirm group membership or other information that may be relevant to the file system access request.

At flowchart block 804, in one or more of the various embodiments, a permissions engine may be arranged to map the native permission values associated with the new file system object to the appropriate platform permission values. In one or more of the various embodiments, a file system that may be accessed by clients using different native permission schemes may be arranged to accept the native permission values provided by clients. In one or more of the various embodiments, there may be one or more different client types (e.g., Windows, Unix, or the like) that have different native permission schemes. In some cases, one or more of these different native permission schemes may support permission values that have different or incompatible semantics.

In one or more of the various embodiments, the permission engine may be arranged to determine one or more map rules or map rulesets that have been configured or customized based on an organizations operational requirements. Accordingly, in some embodiments, the permission engine may select one or more map rules or map ruleset based on identifiers associated with the file system object, the user identity, location (in the file system) of file system object, or the like.

In some embodiments, the map ruleset directly associated with the file system object may be associated with one or more parent map rulesets that may be identified and selected by the permission engine. Accordingly, in some embodiments, the parent map rulesets, if any, and the directly associated map ruleset, if any, may be employed by the permission engine to map the first native permissions mode to the platform permissions. Accordingly, in one or more of the various embodiments, the permissions engine may execute the one or more map rules to map native permission modes to platform permission modes that make up a platform permission scheme.

At flowchart block 806, in one or more of the various embodiments, the file system engine may store the file system object in the file system. In one or more of the various embodiments, as discussed above, the platform permission modes associated with a file system object may be stored or associated with the file system object. In one or more of the various embodiments, the permission values associated with a file system object may be stored with other meta-data associated with file system object. Also, in some embodiments, a reference to platform permission values for a file system object may be stored with that file system object.

Also, in one or more of the various embodiments, a reference to the one or more map rulesets used to map the native permission mode may be stored with the file system object or the with the other meta-data mentioned above.

At flowchart block 808, in one or more of the various embodiments, a second client may attempt to access the file system object. In one or more of the various embodiments, some file systems, especially distributed file systems may be expected to be accessed by clients having different native permission schemes. Accordingly, in one or more of the various embodiments, file system objects created or modified by clients using one native permission scheme may be accessed by other clients that use a different native permission scheme. For example, a file system object created or modified by a Windows client may employ access control lists for native permissions while Unix clients may use conventional POSIX/Unix mode bits/flags. In this example, it is typical for ACL based permissions to support richer or more granular permission rules than POSIX mode bits.

Accordingly, in one or more of the various embodiments, if a client attempts to access a file system object it may request access rights using its native permissions modes. For example, if opening a file, a Unix client may simply request read-access using Unix mode flags. Accordingly, the Unix client will expect the file system to interpret its native permissions correctly. Likewise, if a Windows client assigns inheritable permission values to a folder, it will expect file system objects contained in that folder to inherit permissions as configured.

At flowchart block 810, in one or more of the various embodiments, the permissions engine may be arranged to map the platform permission modes to the native permission modes compatible with the native permission scheme supported by the second client. In one or more of the various embodiments, similar to flowchart block 804, the permissions engine may be arranged to execute one or more map rules or map rulesets to convert platform permission values to native permission values that are appropriate for the second client.

Accordingly, in one or more of the various embodiments, the permission engine may select one or more map rules or map ruleset that include rules, conditions, instructions, or the like, for mapping from the platform permissions modes associated with the file system object to native permission modes that are suitable for the second client.

At flowchart block 812, in one or more of the various embodiments, the permissions engine or the file system engine may be arranged to enforce the second client's access based on the native permission modes that were determined from the platform permission modes. Next, control may be returned to a calling process.

FIG. 9 illustrates a flowchart of process 900 for dynamic permissions mode in accordance with one or more of the various embodiments. After a start block, at flowchart block 902, in one or more of the various embodiments, a permission engine may be provided access operation information that may be associated with an access request. As discussed above, various clients of the file system may perform or attempt to perform various actions that may be require a file system object to be accessed.

Accordingly, in one or more of the various embodiments, the access request may include operation information associated with the type of access that is being requested. In some embodiments, the type of access information may include an indication of the type of operation the client may be attempting, such as, read, write, delete, move, or the like. In some embodiments, the access operation information may include one or more client native permission modes that describe the level of access or the type of access the client is requesting.

At flowchart block 904, in one or more of the various embodiments, the permission engine may be arranged to determine the client identity information that may be associated with the access request. In some embodiments, the access operation may include one or more identifiers that are associated with a user or client that may be submitting the access request. In some embodiments, the provided user or client information may comprise information that conforms to the client native operating system.

Accordingly, in one or more of the various embodiments, the permission engine may be arranged to expand the native version of the user or client identifier into a platform version of the identifiers. For example, the client native representations of a user may be limited or otherwise less expressive than the identity representation information available on the platform. Accordingly, in one or more of the various embodiments, rather than being limited a potentially limited view of the user or client identity, the permission engine may be look up additional identity information that may be associated with the user or client based on the identity information provided by with the access request.

At flowchart block 906, in one or more of the various embodiments, the permission engine may be arranged to determine file system object information associated with the access request. In some embodiments, the access request provided by the client may include one or more identifiers that are consistent or supported by the native environment of the client. In some embodiments, these may be less expressive or less complete than the file system object identifiers used internally by the file system. Accordingly, in one or more of the various embodiments, the permission engine may employ the file system object identifiers provided by the client to lookup or determine the platform file system object identifiers that may be associated with the file system object.

At flowchart block 908, in one or more of the various embodiments, the permission engine may be arranged to determine the permission mode mapping rules associated with the access request. In one or more of the various embodiments, the permission engine may be arranged to lookup one or more map rules or map rulesets that are associated with the access operation information, the user/client platform identity information, the file system object platform information, or the like, or combination thereof.

In some embodiments, the map rules may have been previous stored with the file system object. In these cases, for some of the embodiments, the permission engine may look up the appropriate map rules based on the stored values associated with the file system object.

In some embodiments, the permission engine may be arranged to execute a query on a data store or database to determine the map rules. In some embodiments, the parameters used in the query may include some or all of the access operation information, the user/client platform identity information, the file system object platform information, or the like, or combination thereof.

Accordingly, in one or more of the various embodiments, one or more map rules or map rulesets may be associated, partitioned or grouped based some or all of the user/client platform identity information, the file system object platform information, or the like, or combination thereof.

In one or more of the various embodiments, the map rules may be a single ruleset that is applied to all operations, users, file system object, or the like. In one or more of the various embodiments, the permission engine may be arranged to use different map rules for different circumstances.

At flowchart block 910, in one or more of the various embodiments, the permission engine may be arranged to execute the permission mode mapping rules. In one or more of the various embodiments, the permission engine may be arranged to load the map rules into a memory for execution. Accordingly, in some embodiments, the permission engine may perform various permission mode mapping actions based on each section or portion of the map rules being executed.

In one or more of the various embodiments, the permission engine may be arranged to compile map rules described using human readable instructions (e.g., computer programming languages) into computer readable instructions suitable for execution.

In one or more of the various embodiments, the determined map rules may be provided using specialized computing hardware, such as, ASICs, FPGAs, PALs, or the like.

In such instances, some or all of the map rule actions may be performed by the specialized computing hardware.

In some embodiments, map rules that have been previously compiled may be retrieved by the permission engine and executed. Further, in some embodiments, compiled map rules may be stored in one or more cache memories to improve performance of the permission engine. Accordingly, in one or more of the various embodiments, permissions mode mapping for subsequent file access operations may performed by executed the compiled map rules that are stored in the cache memory.

In one or more of the various embodiments, the permission engine may be arranged to access external services or resources based on the map rules being executed. Accordingly, in some embodiments, the permission engine may communicate some or all of the client identity information or the file system object information to one or more services. For example, in some embodiments, an external service may be used to provide additional validation or verification of user identity for particular map rule actions.

In one or more of the various embodiments, the permission engine may be arranged to map one or more client native permission modes associated with the access request to one or more platform permission modes. Accordingly, in some embodiments, the one or more native permission modes may be mapped to one or more access control entries that represent the platform permission modes associated with the request.

At flowchart block 912, in one or more of the various embodiments, the permission engine may be arranged to provide the platform permission modes associated with the access request to the file system engine. Accordingly, in some embodiments, the file system engine may resolve the access request for the file system object based on the provided platform permission modes.

Next, control may be returned to a calling process.

FIG. 10 illustrates a flowchart of process 1000 for employing dynamic permissions mode to resolve permissions for client access attempts, in accordance with one or more of the various embodiments. After a start block, at flowchart block 1002, in one or more of the various embodiments, a client of the file system may be attempt to access one or more file system objects.

At flowchart block 1004, in one or more of the various embodiments, the permission engine may be arranged to map the requested access rights from client native permission modes to platform permission modes. As described above, the file system engine may be arranged to forward some or all of the information associated with the access request to the permission engine. In response, the permission engine may be determine the appropriate map rules. These map rules may be executed to provide the platform permission modes associated with the access request.

At decision block 1006, in one or more of the various embodiments, the file system engine may be arranged to compare the requested access rights in terms of platform permissions to the platform permissions available to the requesting client for the pending access request. Accordingly, if the access request is allowed, control may to flowchart block 1008; otherwise, control may be returned to a calling process with an indication the access request is denied.

At flowchart block 1008, in one or more of the various embodiments, because the file system has determined the requesting client has the necessary access rights for the access request, the file system engine may enable the client to have access to the file system as per the access request. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors that execute instructions to perform actions, comprising:
  instantiating a file system engine to perform actions including:
    providing a file system that includes one or more file system objects, wherein the one or more file system objects are accessible by two or more clients that use different native permission schemes;
    receiving, from a client, an access request that is associated with the one or more file system objects, wherein the access request includes one or more native permission values that are supported by the client;

providing one or more other requested permission values included in another access request from another client, wherein the other access request is associated with the one or more file system objects, and wherein the one or more other requested permission values are unsupported by the native permission scheme used by the client; and associating the one or more requested permission values and the one or more other permission values with the one or more file system objects; and instantiating a permissions engine to perform actions including:

determining one or more map rules based on one or more characteristics of the access request, wherein the one or more map rules include computer readable instructions that map native permission values to platform permission values from a platform permission scheme;

executing the one or more map rules to provide one or more platform permission values based on the one or more native permission values, wherein the one or more platform permission values are associated with the one or more file system objects, and wherein the platform permission scheme reduces latency and improves efficiency of computing resources employed to access the one or more file system objects by replacing use of the two or more different native permission schemes to define access rights to the one or more file system objects;

comparing one or more requested platform permission values to the platform permission values associated with the one or more file system objects; and providing the access rights to the one or more file system objects based on an affirmative result of the comparison.

2. The method of claim 1, wherein the comparison, further comprises:

iterating over the one or more platform permission values; and determining the access rights to the one or more file system objects based on a first platform permission value that matches the access request.

3. The method of claim 1, wherein the file system engine performs further actions, including:

receiving a request from the client to store a file system object in the file system, wherein the file system object is associated with one or more native permission values; and employing the permissions engine to associate one or more inheritable platform permission values to the file system object based on the platform permission values that are associated with a parent file system object or a container file system object associated with the file system object.

4. The method of claim 1, wherein providing the one or more requested platform permission values further comprises, executing one or more mapping rules to convert between the platform permission values and the native permission values, wherein the platform permission values that are unsupported by a client's native permission scheme are omitted from the one or more requested platform permission values.

5. The method of claim 1, wherein providing the one or more platform permission values, further comprises:

providing one or more joint platform permission values that are supported by each of the two or more clients; and providing one or more disjoint platform permission values that are supported by a portion of the two or more clients.

6. The method of claim 1, wherein the one or more requested platform permission values are based on the platform permission scheme and the native permission values included in the access request.

7. The method of claim 1, wherein the comparison, further comprises:

communicating with a separate service to confirm one or more characteristics of the client or the access request; and modifying the provided access rights based on a response to the communication.

8. A system for managing data in a file system over a network comprising:

a network computer, comprising:

a memory that stores at least instructions; and one or more processors that execute instructions that perform actions, including:

instantiating a file system engine to perform actions including:

providing a file system that includes one or more file system objects, wherein the one or more file system objects are accessible by two or more clients that use different native permission schemes;

receiving, from a client, an access request that is associated with the one or more file system objects, wherein the access request includes one or more native permission values that are supported by the client;

providing one or more other requested permission values included in another access request from another client, wherein the other access request is associated with the one or more file system objects, and wherein the one or more other requested permission values are unsupported by the native permission scheme used by the client; and associating the one or more requested permission values and the one or more other permission values with the one or more file system objects; and instantiating a permissions engine to perform actions including:

determining one or more map rules based on one or more characteristics of the access request, wherein the one or more map rules include computer readable instructions that map native permission values to platform permission values from a platform permission scheme;

executing the one or more map rules to provide one or more platform permission values based on the one or more native permission values, wherein the one or more platform permission values are associated with the one or more file system objects, and wherein the platform permission scheme reduces latency and improves efficiency of computing resources employed to access the one or more file system objects by replacing use of the two or more different native permission schemes to define access rights to the one or more file system objects;

comparing one or more requested platform permission values to the platform permission values associated with the one or more file system objects; and providing the access rights to the one or more file system objects based on an affirmative result of the comparison; and a client computer, comprising:
a memory that stores at least instructions; and
one or more processors that execute instructions that perform actions, including:
providing the access request and the other access request.

9. The system of claim 8, wherein the comparison, further comprises:
iterating over the one or more platform permission values; and
determining the access rights to the one or more file system objects based on a first platform permission value that matches the access request.

10. The system of claim 8, wherein the file system engine performs further actions, including:
receiving a request from the client to store a file system object in the file system, wherein the file system object is associated with one or more native permission values; and
employing the permissions engine to associate one or more inheritable platform permission values to the file system object based on the platform permission values that are associated with a parent file system object or a container file system object associated with the file system object.

11. The system of claim 8, wherein providing the one or more requested platform permission values further comprises, executing one or more mapping rules to convert between the platform permission values and the native permission values, wherein the platform permission values that are unsupported by a client's native permission scheme are omitted from the one or more requested platform permission values.

12. The system of claim 8, wherein providing the one or more platform permission values, further comprises:
providing one or more joint platform permission values that are supported by each of the two or more clients; and
providing one or more disjoint platform permission values that are supported by a portion of the two or more clients.

13. The system of claim 8, wherein the one or more requested platform permission values are based on the platform permission scheme and the native permission values included in the access request.

14. The system of claim 8, wherein the comparison, further comprises:
communicating with a separate service to confirm one or more characteristics of the client or the access request; and
modifying the provided access rights based on a response to the communication.

15. A processor readable non-transitory storage media that includes instructions for managing data in a file system over a network, wherein execution of the instructions by one or more processors on one or more network computers performs actions, comprising:
instantiating a file system engine to perform actions including:

providing a file system that includes one or more file system objects, wherein the one or more file system objects are accessible by two or more clients that use different native permission schemes;

receiving, from a client, an access request that is associated with the one or more file system objects, wherein the access request includes one or more native permission values that are supported by the client;

providing one or more other requested permission values included in another access request from another client, wherein the other access request is associated with the one or more file system objects, and wherein the one or more other requested permission values are unsupported by the native permission scheme used by the client; and associating the one or more requested permission values and the one or more other permission values with the one or more file system objects; and instantiating a permissions engine to perform actions including:

determining one or more map rules based on one or more characteristics of the access request, wherein the one or more map rules include computer readable instructions that map native permission values to platform permission values from a platform permission scheme;

executing the one or more map rules to provide one or more platform permission values based on the one or more native permission values, wherein the one or more platform permission values are associated with the one or more file system objects, and wherein the platform permission scheme reduces latency and improves efficiency of computing resources employed to access the one or more file system objects by replacing use of the two or more different native permission schemes to define access rights to the one or more file system objects;

comparing one or more requested platform permission values to the platform permission values associated with the one or more file system objects; and providing the access rights to the one or more file system objects based on an affirmative result of the comparison.

16. The media of claim 15, wherein the comparison, further comprises:
iterating over the one or more platform permission values; and
determining the access rights to the one or more file system objects based on a first platform permission value that matches the access request.

17. The media of claim 15, wherein the file system engine performs further actions, including:
receiving a request from the client to store a file system object in the file system, wherein the file system object is associated with one or more native permission values; and
employing the permissions engine to associate one or more inheritable platform permission values to the file system object based on the platform permission values that are associated with a parent file system object or a container file system object associated with the file system object.

18. The media of claim 15, wherein providing the one or more requested platform permission values further comprises, executing one or more mapping rules to convert between the platform permission values and the native permission values, wherein the platform permission values that are unsupported by a client's native permission scheme are omitted from the one or more requested platform permission values.

19. The media of claim 15, wherein providing the one or more platform permission values, further comprises:
providing one or more joint platform permission values that are supported by each of the two or more clients; and
providing one or more disjoint platform permission values that are supported by a portion of the two or more clients.

20. The media of claim 15, wherein the one or more requested platform permission values are based on the platform permission scheme and the native permission values included in the access request.

21. A network computer for managing data in a file system, comprising:
a transceiver that communicates over the network;
a memory that stores at least instructions; and
one or more processors that execute instructions that perform actions, including:
instantiating a file system engine to perform actions including:
providing a file system that includes one or more file system objects, wherein the one or more file system objects are accessible by two or more clients that use different native permission schemes;
receiving, from a client, an access request that is associated with the one or more file system objects, wherein the access request includes one or more native permission values that are supported by the client;
providing one or more other requested permission values included in another access request from another client, wherein the other access request is associated with the one or more file system objects, and wherein the one or more other requested permission values are unsupported by the native permission scheme used by the client; and
associating the one or more requested permission values and the one or more other permission values with the one or more file system objects; and
instantiating a permissions engine to perform actions including:
determining one or more map rules based on one or more characteristics of the access request, wherein the one or more map rules include computer readable instructions that map native permission values to platform permission values from a platform permission scheme;
executing the one or more map rules to provide one or more platform permission values based on the one or more native permission values, wherein the one or more platform permission values are associated with the one or more file system objects, and wherein the platform permission scheme reduces latency and improves efficiency of computing resources employed to access the one or more file system objects by replacing use of the two or more different native permission schemes to define access rights to the one or more file system objects;
comparing one or more requested platform permission values to the platform permission values associated with the one or more file system objects; and
providing the access rights to the one or more file system objects based on an affirmative result of the comparison.

22. The network computer of claim 21, wherein the comparison, further comprises:
iterating over the one or more platform permission values; and
determining the access rights to the one or more file system objects based on a first platform permission value that matches the access request.

23. The network computer of claim 21, wherein the file system engine performs further actions, including:
receiving a request from the client to store a file system object in the file system, wherein the file system object is associated with one or more native permission values; and
employing the permissions engine to associate one or more inheritable platform permission values to the file system object based on the platform permission values that are associated with a parent file system object or a container file system object associated with the file system object.

24. The network computer of claim 21, wherein providing the one or more requested platform permission values further comprises, executing one or more mapping rules to convert between the platform permission values and the native permission values, wherein the platform permission values that are unsupported by a client's native permission scheme are omitted from the one or more requested platform permission values.

25. The network computer of claim 21, wherein providing the one or more platform permission values, further comprises:
providing one or more joint platform permission values that are supported by each of the two or more clients; and
providing one or more disjoint platform permission values that are supported by a portion of the two or more clients.

26. The network computer of claim 21, wherein the one or more requested platform permission values are based on the platform permission scheme and the native permission values included in the access request.

* * * * *